US012556000B2

United States Patent
Thokala et al.

(10) Patent No.: US 12,556,000 B2
(45) Date of Patent: Feb. 17, 2026

(54) METHODS AND SYSTEMS FOR DETERMINING POWER LOAD DISAGRREGATION PROFILE OF A BUILDING

(71) Applicant: Tata Consultancy Services Limited, Mumbai (IN)

(72) Inventors: Naveen Kumar Thokala, Hyderabad (IN); Spoorthy Paresh, Bangalore (IN); Jose Ignacio Mateos Albiach, Madrid (ES); Arup Kumar Das, Bangalore (IN); Mariswamy Girish Chandra, Bangalore (IN)

(73) Assignee: TATA CONSULTANCY SERVICES LIMITED, Mumbai (IN)

( * ) Notice: Subject to any disclaimer, the term of this patent is extended or adjusted under 35 U.S.C. 154(b) by 401 days.

(21) Appl. No.: 18/176,237

(22) Filed: Feb. 28, 2023

(65) Prior Publication Data

US 2023/0307907 A1 Sep. 28, 2023

(30) Foreign Application Priority Data

Mar. 22, 2022 (IN) .............................. 202221015891

(51) Int. Cl.
*H02J 3/00* (2006.01)
*H02J 3/0012* (2026.01)

(52) U.S. Cl.
CPC ............ *H02J 3/003* (2020.01); *H02J 3/0012* (2020.01); *H02J 2310/14* (2020.01); *H02J 2310/70* (2020.01)

(58) Field of Classification Search
CPC .... G01D 2204/24; G01D 4/004; G01D 4/002; G01D 2204/12; G01D 2204/14;
(Continued)

(56) References Cited

U.S. PATENT DOCUMENTS 9,256,908 B2 2/2016 Dai et al.
9,310,865 B2 4/2016 G et al.
(Continued)

OTHER PUBLICATIONS

Basua, Kaustav et al., "A generic data driven approach for low sampling load Disaggregation", Transactions on Multimedia, Date: Apr. 2017, vol. 9, pp. 118-127, Publisher: Science Direct, https://www.sciencedirect.com/science/article/abs/pii/S2352467716302302.
(Continued)

*Primary Examiner* — Darrin D Dunn
(74) *Attorney, Agent, or Firm* — Finnegan, Henderson, Farabow, Garrett & Dunner, LLP

(57) ABSTRACT

This disclosure relates generally to methods and systems for determining the power load disaggregation profile of a building. Most of the conventional techniques are algorithmic centric, specific to certain scenarios and does not employ the low-sampling rate data due to the complexity involved. Present disclosure determines the power load disaggregation profile of the building using the low-sampling rate power consumption data accurately. According to the present disclosure, firstly, the background power loads are detected and removed from the low-sampled data samples. Next, a robust event detection mechanism is employed to detect the events when the change in the power consumption occurred, and such events are paired using the iterative pairing technique. Further, a set of event clusters are formed using the density-based clustering technique and lastly, each of the set of event clusters are classified with each appliance type using a rule-based classification technique.

15 Claims, 12 Drawing Sheets

(58) Field of Classification Search
CPC ... Y04S 10/50; Y04S 20/221; G05B 23/0221; G05B 2219/24042
See application file for complete search history.

(56) References Cited

U.S. PATENT DOCUMENTS

| | | | | |
|---|---|---|---|---|
| 9,817,045 | B2* | 11/2017 | Zeifman | G01D 4/002 |
| 11,461,686 | B2* | 10/2022 | Dean | G06Q 50/06 |
| 2011/0004421 | A1* | 1/2011 | Rosewell | G01D 4/002 |
| | | | | 702/45 |
| 2012/0059607 | A1* | 3/2012 | Rebec | H02J 3/00 |
| | | | | 702/61 |
| 2012/0271576 | A1* | 10/2012 | Kamel | H02J 3/381 |
| | | | | 702/62 |
| 2013/0103215 | A1* | 4/2013 | Dai | G06Q 50/06 |
| | | | | 700/291 |
| 2013/0103656 | A1* | 4/2013 | Sanchez Loureda | G06F 16/17 |
| | | | | 707/693 |
| 2013/0110621 | A1* | 5/2013 | Gupta | G01D 4/004 |
| | | | | 702/60 |
| 2014/0172772 | A1* | 6/2014 | Sanchez Loureda | G01D 4/00 |
| | | | | 706/52 |
| 2015/0377935 | A1 | 12/2015 | Kuhns et al. | |
| 2016/0109492 | A1* | 4/2016 | Labatie | G01R 19/2513 |
| | | | | 702/61 |
| 2018/0096439 | A1* | 4/2018 | Davies | G06Q 30/04 |
| 2018/0259556 | A1* | 9/2018 | Labatie | G01R 21/133 |
| 2018/0285788 | A1* | 10/2018 | Andrei | G06F 16/287 |
| 2019/0347670 | A1* | 11/2019 | Abramson | G06N 5/027 |
| 2020/0249647 | A1* | 8/2020 | Yang | G05B 19/0428 |
| 2021/0109833 | A1* | 4/2021 | Petladwala | G06F 11/3409 |
| 2021/0384761 | A1* | 12/2021 | Menzel | G01R 21/1331 |
| 2023/0275454 | A1* | 8/2023 | Taheri | G06Q 50/06 |
| | | | | 700/291 |
| 2023/0299611 | A1* | 9/2023 | Taheri | H02J 13/00001 |
| | | | | 700/291 |
| 2023/0307907 | A1* | 9/2023 | Thokala | H02J 3/0012 |

OTHER PUBLICATIONS

Zhao, Bochao et al., "On a Training-Less Solution for Non-Intrusive Appliance Load Monitoring Using Graph Signal Processing", IEEE Access, Date: 2021, vol. 4, pp. 1784-1799, Publisher: IEEE, Link: ps://ieeexplore.ieee.org/stamp/stamp.jsp?arnumber=7457610.

* cited by examiner

METHODS AND SYSTEMS FOR DETERMINING POWER LOAD DISAGRREGATION PROFILE OF A BUILDING

PRIORITY CLAIM

This U.S. patent application claims priority under 35 U.S.C. § 119 to: Indian Patent Application No. 202221015891, filed on Mar. 22, 2022. The entire contents of the aforementioned application are incorporated herein by reference.

TECHNICAL FIELD

The disclosure herein generally relates to the field of power consumption, and, more particularly, to methods and systems for determining the power load disaggregation profile of a building having a plurality of appliance types.

BACKGROUND

Electrical or power load disaggregation gives the amount of energy spent by the consumers for the appliances installed in a building. The power load disaggregation provides energy know-how to the consumers enabling them to optimize respective power or energy consumption, which further helps in cost reduction. Also, the power load disaggregation is useful for forecasting and alerting the consumers about their energy spending in a given time interval. Further, the power load disaggregation is used to let the consumers know how efficient in the energy consumption of one consumer, compared to other consumers. The power load disaggregation also helps to apply optimized planning for peak load shaving, energy saving recommendations, appliances recommendations, control on scheduled loads, and so on.

Solving the power load disaggregation problem is quite challenging, as the number of the appliances and appliance types installed in the building of the consumer, is unknown in prior. Further, the operational time of the appliance types vary from time to time and unpredictable. There are many techniques in the art for solving the power load disaggregation problem. The techniques for solving the power load disaggregation problem usually analyze the metering data obtained from a meter installed in the building. However, most of the conventional techniques are academic in nature, algorithmic centric and specific to certain scenarios and applications. Using the low-sampling rate metering data may provide better accurate results of the power load disaggregation. However, most of the conventional techniques does not employ the low-sampling rate data for determining the power load disaggregation, due to various challenges. Some of the challenges include (i), detecting power variations is quite complex, as they are caused by internal electric circuits (electronics in TV or laptop, power variations caused due to motor operation change in washing machine or dish washer, and so on) due to averaging of the power consumption in such low sampled data, (ii) larger appliances have almost similar power consumption, and (iii) the power consumption of multiple appliances may overlap due to the appliance operation at different levels (modes), and so on. Hence determining the power load disaggregation, using the low sample data accurately is technically challenging and always an area of improvement.

SUMMARY

Embodiments of the present disclosure present technological improvements as solutions to one or more of the above-mentioned technical problems recognized by the inventors in conventional systems.

In an aspect, a processor-implemented method for determining a power load disaggregation profile of a building. The method including the steps of: receiving sequentially, a plurality of data samples associated with a power consumption of the building having a plurality of appliance types, and a time stamp for each of the plurality of data samples; pre-processing the plurality of data samples to obtain a plurality of pre-processed data samples and the time stamp for each of the plurality of pre-processed data samples, wherein the pre-processing includes filling missing data and outlier removal; detecting and removing one or more background power load consumptions, from each of the plurality of pre-processed data samples, to obtain a plurality of resultant data samples; detecting a plurality of positive events and a plurality of negative events, from amongst the plurality of resultant data samples, using the time stamp for each of the plurality of resultant data samples, based on a change in the power consumption; obtaining one or more event pairs, from the plurality of positive events and the plurality of negative events, using an iterative event pairing technique; forming one or more event pair clusters from the one or more event pairs, using a density-based clustering technique; and classifying an appliance type of the plurality of appliance types, for each of the one or more event pair clusters, and estimating the power consumption for each of the classified appliance type, using a rule-based classification technique, to obtain the power load disaggregation profile of the building.

In another aspect, a system for determining a power load disaggregation profile of a building is provided. The system includes: a memory storing instructions; one or more Input/Output (I/O) interfaces; and one or more hardware processors coupled to the memory via the one or more I/O interfaces, wherein the one or more hardware processors are configured by the instructions to: receive sequentially, a plurality of data samples associated with a power consumption of the building having a plurality of appliance types, and a time stamp for each of the plurality of data samples; pre-process the plurality of data samples to obtain a plurality of pre-processed data samples, wherein the pre-processing includes filling missing data and outlier removal; detect and remove one or more background power load consumptions, from each of the plurality of pre-processed data samples, to obtain a plurality of resultant data samples; detect a plurality of positive events and a plurality of negative events, from amongst the plurality of resultant data samples, using the time stamp for each of the plurality of resultant data samples, based on a change in the power consumption; obtain one or more event pairs, from the plurality of positive events and the plurality of negative events, using an iterative event pairing technique; form one or more event pair clusters from the one or more event pairs, using a density-based clustering technique; and classify an appliance type of the plurality of appliance types, for each of the one or more event pair clusters, and estimating the power consumption for each of the classified appliance type, using a rule-based classification technique, to obtain the power load disaggregation profile of the building.

In yet another aspect, there is provided one or more non-transitory machine-readable information storage mediums comprising one or more instructions which when executed by one or more hardware processors cause: receiving sequentially, a plurality of data samples associated with a power consumption of the building having a plurality of appliance types, and a time stamp for each of the plurality of data samples; pre-processing the plurality of data samples to obtain a plurality of pre-processed data samples, wherein the pre-processing includes filling missing data and outlier removal; detecting and removing one or more background power load consumptions, from each of the plurality of pre-processed data samples, to obtain a plurality of resultant data samples; detecting a plurality of positive events and a plurality of negative events, from amongst the plurality of resultant data samples, using the time stamp for each of the plurality of resultant data samples, based on a change in the power consumption; obtaining one or more event pairs, from the plurality of positive events and the plurality of negative events, using an iterative event pairing technique; forming one or more event pair clusters from the one or more event pairs, using a density-based clustering technique; and classifying an appliance type of the plurality of appliance types, for each of the one or more event pair clusters, and estimating the power consumption for each of the classified appliance type, using a rule-based classification technique, to obtain the power load disaggregation profile of the building.

In an embodiment, each data sample is obtained at a predefined low-sampling rate.

In an embodiment, the plurality of data samples associated with the power consumption of the building, is of a predefined time-window.

In an embodiment, the one or more background power load consumptions from each of the plurality of pre-processed data samples, are detected based on a first minimum threshold value and a second minimum threshold value, wherein the first minimum threshold value and the second minimum threshold value tare determined using night power load consumptions.

In an embodiment, detecting the plurality of positive events and the plurality of negative events, from the plurality of resultant data samples, using the time stamp for each of the plurality of resultant data samples, based on the change in the power consumption, comprising: detecting a plurality of events, from the plurality of resultant data samples, based on the change in the power consumption between two consecutive resultant data samples is greater than or equal to an event threshold value; detecting the plurality of positive events out of the plurality of events having the change in the power consumption between two consecutive resultant data samples, greater than or equal to zero; and detecting the plurality of negative events out of the plurality of events, having the change in the power consumption between two consecutive resultant data samples, less than zero.

In an embodiment, one or more positive events of the plurality of positive events having occurred sequentially between consecutive resultant data samples, are combined to obtain composite positive events, and one or more negative events of the plurality of negative events having occurred sequentially between consecutive resultant data samples, are combined to obtain composite negative events In an embodiment, obtaining the one or more event pairs, from the plurality of positive events and the plurality of negative events, using the iterative event pairing technique, comprising: (a) selecting randomly, a positive event out of the plurality of positive events; (b) calculating a weighted Euclidian distance between (i) the positive event randomly selected, and (ii) each of the plurality of negative events that fall inside a predefined first threshold value; (c) identifying a negative event of the plurality of negative events, that is closer to the positive event randomly selected, based on the weighted Euclidian distance; (d) pairing the positive event randomly selected and the negative event identified, to form an event pair; (e) removing the positive event and the negative event, that are paired, from the plurality of positive events and the plurality of negative events, to obtain a plurality of first positive events and a plurality of first negative events; (f) repeating the steps (a) through (e) by selecting randomly, the first positive event out of the plurality of first positive events and considering the first positive event randomly selected as the positive event randomly selected, the plurality of first positive events as the plurality of positive events and the plurality of first negative events as the plurality of negative events; (g) obtaining one or more second positive events out of the plurality of first positive events and one or more second negative events out of the plurality of first negative events, that are not paired; and (h) repeating the steps (a) through (g), by selecting randomly, the second positive event out of the one or more second positive events and considering the second positive event randomly selected as the positive event randomly selected, the one or more second positive events as the plurality of positive events, the one or more second first negative events as the plurality of negative events, and an iteratively calculated predefined successive threshold value as the predefined first threshold value, to obtain the one or more event pairs.

In an embodiment, forming the one or more event pair clusters from the one or more event pairs, using the density-based clustering technique, comprising: (a) selecting randomly, an event pair out of the one or more event pairs; (b) determining a first set of event pairs out of the remaining event pairs, whose event pair average power value is within a predefined limit of the event pair average power value of the event pair randomly selected; (c) adding the first set of event pairs determined with the event pair randomly selected to form an initial cluster; (d) calculating an event pair average power mean value of the initial cluster formed; (e) determining a second set of event pairs out of the one or more event pairs, whose event pair average power value is within the limit of the event pair average power mean value of the initial cluster formed; (f) grouping the second set of event pairs to form a successive cluster; (g) calculating the event pair average power mean value of the successive cluster formed; (h) repeating the steps (e) through (g) until either a predefined iterations are completed or no change in the event pair average power mean value of the successive cluster, to form a first cluster; (i) obtaining the remaining event pairs that are not part of the first cluster; and (j) repeating the steps (a) through (i), by taking the remaining event pairs that are not part of the first cluster, as one or more event pairs, to obtain remaining clusters.

In an embodiment, the rule-based classification technique comprises a set of rules and each of the set of rules is defined based on (i) appliance consumption levels of each appliance type, (ii) an usual operational time of each appliance type, (iii) an usage behaviour of each appliance type, and (iv) seasonal appliance information of each appliance type, obtained using correlation analysis of annual power consumption of the building and local weather information.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Figure 1:
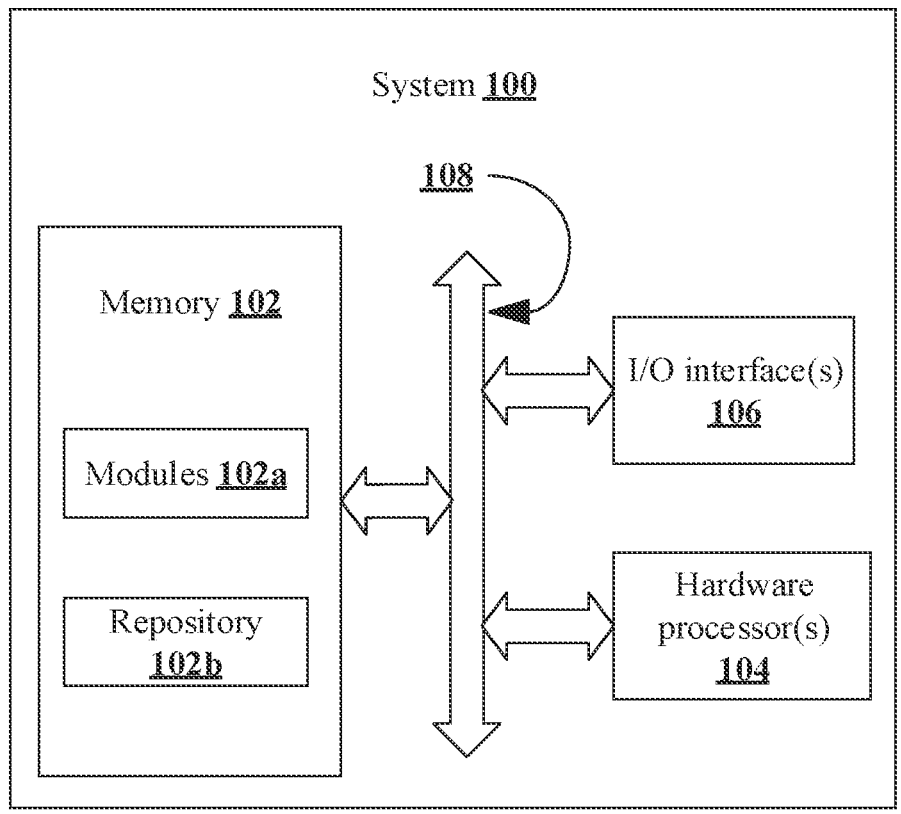
FIG. 1 is an exemplary block diagram of a system for determining a power load disaggregation profile of a building, in accordance with some embodiments of the present disclosure.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the scope of the disclosed embodiments.

The present disclosure herein provides methods and systems for determining the power load disaggregation profile of a building, that addresses the technical problems in the art using the low-sampling rate power consumption data accurately. According to the present disclosure, firstly, the background power loads such as low power loads and vampire loads are detected and removed from the low-sampled data samples, using a dynamic threshold. Next, a robust event detection mechanism is employed to detect the events that are resulted when the change in the power consumption occurred and such events are paired using an iterative pairing technique using dynamic thresholds on both power magnitude and the operational time. Further, a set of event clusters are formed using a density-based clustering technique. Lastly, each of the set of event clusters are classified with each appliance type using a rule-based classification technique.

Referring now to the drawings, and more particularly to FIG. 1 through FIG. 11, where similar reference characters denote corresponding features consistently throughout the figures, there are shown preferred embodiments and these embodiments are described in the context of the following exemplary systems and/or methods.

FIG. 1 is an exemplary block diagram of a system 100 for determining a power load disaggregation profile of a building, in accordance with some embodiments of the present disclosure. In an embodiment, the system 100 includes or is otherwise in communication with one or more hardware processors 104, communication interface device(s) or input/output (I/O) interface(s) 106, and one or more data storage devices or memory 102 operatively coupled to the one or more hardware processors 104. The one or more hardware processors 104, the memory 102, and the I/O interface(s) 106 may be coupled to a system bus 108 or a similar mechanism.

The I/O interface(s) 106 may include a variety of software and hardware interfaces, for example, a web interface, a graphical user interface, and the like. The I/O interface(s) 106 may include a variety of software and hardware interfaces, for example, interfaces for peripheral device(s), such as a keyboard, a mouse, an external memory, a plurality of sensor devices, a printer and the like. Further, the I/O interface(s) 106 may enable the system 100 to communicate with other devices, such as web servers and external databases.

The I/O interface(s) 106 can facilitate multiple communications within a wide variety of networks and protocol types, including wired networks, for example, local area network (LAN), cable, etc., and wireless networks, such as Wireless LAN (WLAN), cellular, or satellite. For the purpose, the I/O interface(s) 106 may include one or more ports for connecting a number of computing systems with one another or to another server computer. Further, the I/O interface(s) 106 may include one or more ports for connecting a number of devices to one another or to another server.

The one or more hardware processors 104 may be implemented as one or more microprocessors, microcomputers, microcontrollers, digital signal processors, central processing units, state machines, logic circuitries, and/or any devices that manipulate signals based on operational instructions. Among other capabilities, the one or more hardware processors 104 are configured to fetch and execute computer-readable instructions stored in the memory 102. In the context of the present disclosure, the expressions 'processors' and 'hardware processors' may be used interchangeably. In an embodiment, the system 100 can be implemented in a variety of computing systems, such as laptop computers, portable computers, notebooks, hand-held devices, workstations, mainframe computers, servers, a network cloud and the like.

The memory 102 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. In an embodiment, the memory 102 includes a plurality of modules 102a and a repository 102b for storing data processed, received, and generated by one or more of the plurality of modules 102a.

The plurality of modules 102a may include routines, programs, objects, components, data structures, and so on, which perform particular tasks or implement particular abstract data types.

The plurality of modules 102a may include programs or computer-readable instructions or coded instructions that supplement applications or functions performed by the system 100. The plurality of modules 102a may also be used as, signal processor(s), state machine(s), logic circuitries, and/or any other device or component that manipulates signals based on operational instructions. Further, the plurality of modules 102a can be used by hardware, by computer-readable instructions executed by the one or more hardware processors 104, or by a combination thereof. In an embodiment, the plurality of modules 102a can include various sub-modules (not shown in FIG. 1). Further, the memory 102 may include information pertaining to input(s)/output(s) of each step performed by the processor(s) 104 of the system 100 and methods of the present disclosure.

The repository 102b may include a database or a data engine. Further, the repository 102b amongst other things, may serve as a database or includes a plurality of databases for storing the data that is processed, received, or generated as a result of the execution of the plurality of modules 102a. Although the repository 102a is shown internal to the system 100, it will be noted that, in alternate embodiments, the repository 102b can also be implemented external to the system 100, where the repository 102b may be stored within an external database (not shown in FIG. 1) communicatively coupled to the system 100. The data contained within such external database may be periodically updated. For example, data may be added into the external database and/or existing data may be modified and/or non-useful data may be deleted from the external database. In one example, the data may be stored in an external system, such as a Lightweight Directory Access Protocol (LDAP) directory and a Relational Database Management System (RDBMS). In another embodiment, the data stored in the repository 102b may be distributed between the system 100 and the external database.

Figure 2A:
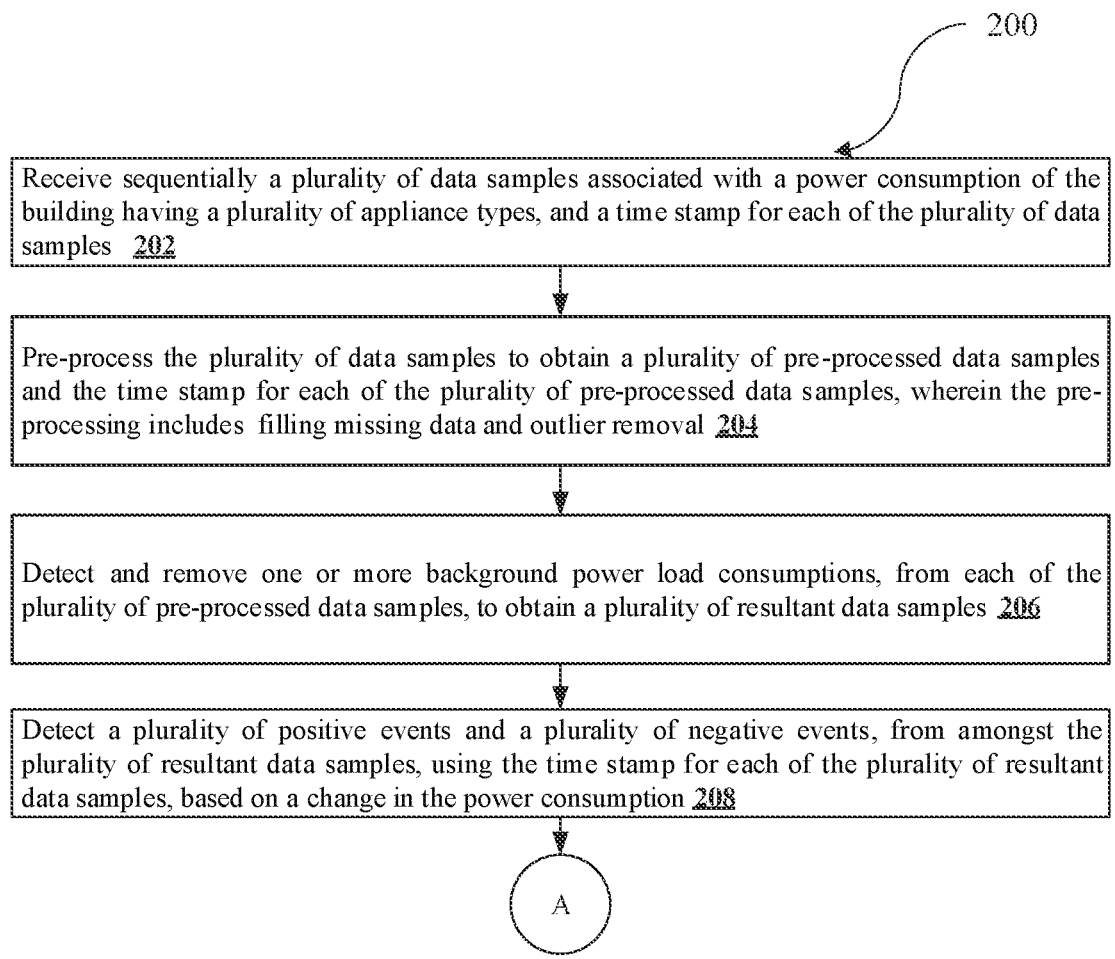
FIG. 2A and FIG. 2B illustrates exemplary flow diagrams of a processor-implemented method for determining the power load disaggregation profile of the building, in accordance with some embodiments of the present disclosure.
Figure 2B:
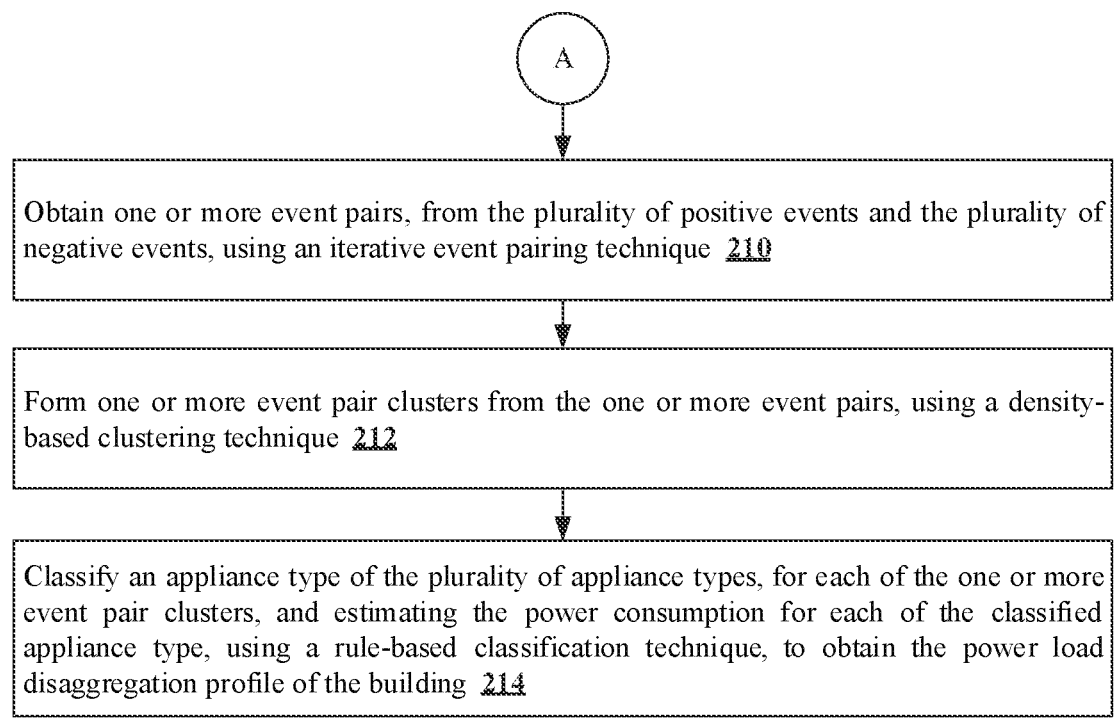

Referring to FIG. 2A and FIG. 2B, components and functionalities of the system 100 are described in accordance with an example embodiment of the present disclosure. For example, FIG. 2A and FIG. 2B illustrates exemplary flow diagrams of a processor-implemented method 200 for determining the power load disaggregation profile of the building, in accordance with some embodiments of the present disclosure. Although steps of the method 200 including process steps, method steps, techniques or the like may be described in a sequential order, such processes, methods and techniques may be configured to work in alternate orders. In other words, any sequence or order of steps that may be described does not necessarily indicate a requirement that the steps be performed in that order. The steps of processes described herein may be performed in any practical order. Further, some steps may be performed simultaneously, or some steps may be performed alone or independently.

At step 202 of the method 200, the one or more hardware processors 104 of the system 100 are configured to receive a plurality of data samples associated with a power consumption of the building, and a time stamp for each of the plurality of data samples. The building includes a plurality of appliance types. In an embodiment, the building is connected to a power source or a power grid, through metering equipment such as smart meters, utility meters, and so on. In an embodiment, the building includes a household, an apartment, an office building, or any bounded structure having the plurality of appliance types. In an embodiment, the plurality of appliance types indicate any electric equipment or an electric device that consume power, and includes but are not limited to a lighting equipment, an air conditioner (AC), a refrigerator, cooking appliances such as a microwave oven, a toaster, a kettle and so on, a heating equipment such as space heater, a washing machine, a charging station, and other electric equipment.

The power consumption of the building is the power consumed by the plurality of appliance types installed in the building. However, the plurality of appliance types and number of the plurality of appliance types is unknown in prior and the objective of the present invention is to first detect the plurality of appliance types installed in the building and secondly, determining the power consumption of each appliance type using the power consumption of the building to obtain the power load disaggregation profile of the building.

The plurality of data samples may be measured using the metering equipment such as the smart meter installed in the building. Each data sample of the plurality of data samples, is a power signal, obtained at a predefined low-sampling rate. For example, the predefined low-sampling rate may be of 5 minutes, i.e., the data sample is obtained at every 5 minutes during the power consumption of the building. Further, the plurality of data samples associated with the power consumption of the building, is of a predefined time-window. For example, the predefined time-window may be 4 weeks, one day, and so on. The technical challenges of the present invention are to determine the power load disaggregation of the building having various unknown appliances, using such low-sampling data.

The timestamp of each data sample may be indicated using a Datetimes function having a date and a time for each data sample. Hence the timestamp of each data sample is generated based on the predefined low-sampling rate (for example, for every 5 minutes).

At step 204 of the method 200, the one or more hardware processors 104 of the system 100 are configured to pre-process each of the plurality of data samples received at step 202 of the method 200 to obtain a plurality of pre-processed data samples. The pre-processing includes filling missing data and outlier removal. Missing timestamp for the data sample is filled based on the predefined low-sampling rate and timestamp of the previous non-zero data sample. If the missing timestamps that are consecutive are more than two, then such timestamps are filled with zero assuming the power off scenario. Missing power consumption for the data samples is filled based on minimum power consumption observed during night-time for a time period, for example, 15 minutes data.

Figure 5:
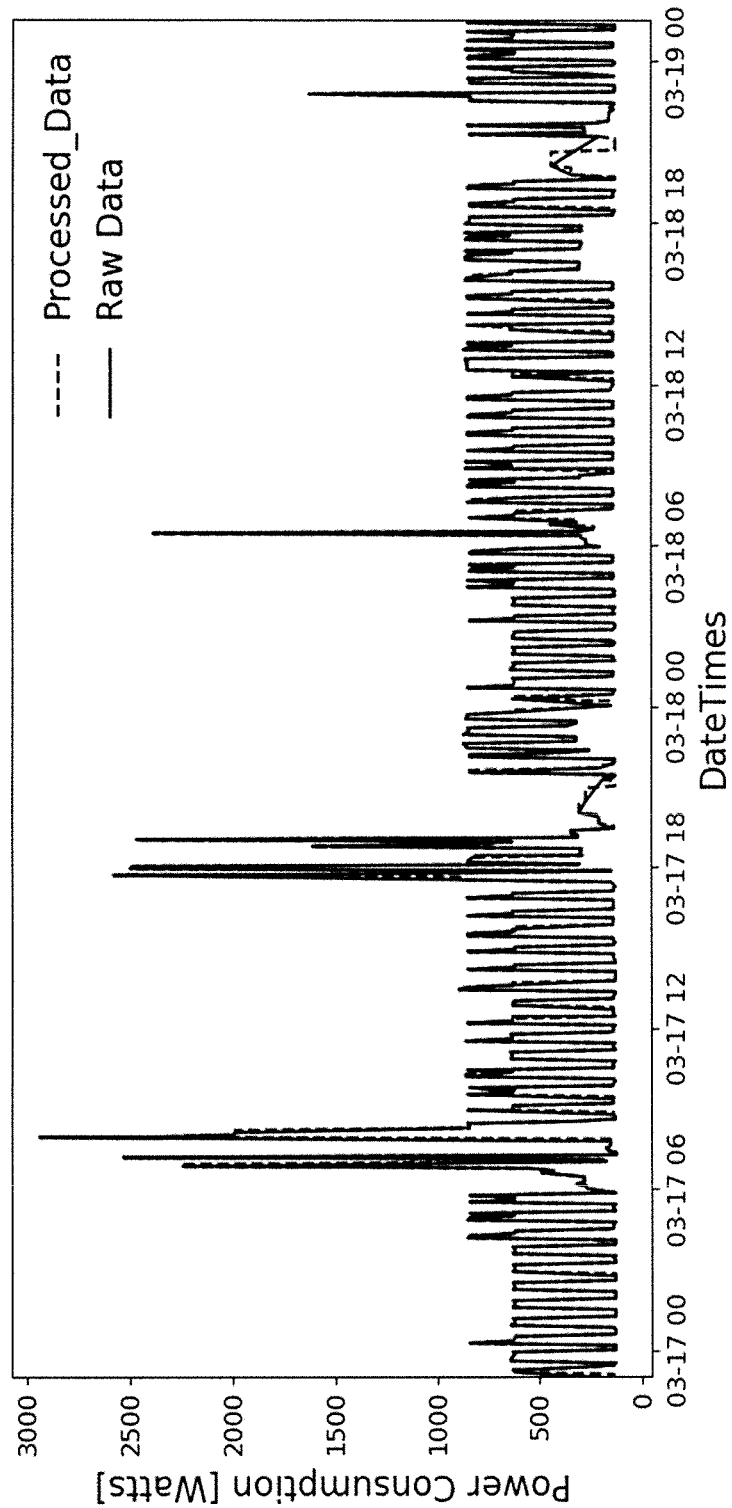
FIG. 5 is a graph showing exemplary power consumption data samples and corresponding processed power consumption data samples, in accordance with some embodiments of the present disclosure.

The outlier removal includes removing the noise such as either zero power consumption values, or the very large power consumption values, from the plurality of data samples. The very large power consumption values may be detected that are more than a cut-off value which is a sum of a mean and 3 times standard deviation of the power consumption values of the day. The pre-processing of the plurality of data samples helps in accurate power load disaggregation profile of the building. FIG. 5 is a graph showing exemplary power consumption data samples and corresponding processed power consumption data samples, in accordance with some embodiments of the present disclosure. As shown in FIG. 5, the re-processing of the power consumption data samples obtained from the smart meter data, is carried out to identify any outliers or missing values. The outliers having the values that are more than the sum of mean of the data and 3 times the standard deviation of the data, are removed. Missing values in the data samples are replaced with the last value up till 15 minutes and beyond that the missing values are filled with minimum power consumption of the building.

At step 206 of the method 200, the one or more hardware processors 104 of the system 100 are configured to detect and remove one or more background power load consumptions, from each of the plurality of pre-processed data samples obtained at step 204 of the method 200, to obtain a plurality of resultant data samples. The one or more background power load consumptions constitutes of small power consuming loads, always on loads (for examples by exhaust fans, fridge, alarm systems etc.,) and vampire loads) as they contribute small variations to the total power consumption.

The one or more background power load consumptions from each of the plurality of pre-processed data samples, based on a first minimum threshold value and a second minimum threshold value. The first minimum threshold value and the second minimum threshold value are determined using minimum night power load consumptions. The night power load consumptions are the power load consumptions observed during night-time and are considered either from night-time historical night-time power load consumptions data of the building or from the data samples observed during night-time (using timestamps) out of the plurality of data samples received at step 202 of the method 200.

In an embodiment, if $P_1, P_2, P_3, \ldots, P_n$ are the minimum power load consumptions observed during night-time of the n days, then the first minimum threshold value (Min_Threshold1) is defined as the minimum out of the $P_1, P_2, P_3, \ldots, P_n$, and mathematically expressed as in equation 1:

$$\text{Min\_Threshold1} = \text{Miniumum}(P_1, P_2, P_3, \ldots, P_n) \quad (1)$$

And the second minimum threshold value (Min_Threshold2) is defined based on the first minimum threshold value (Min_Threshold1), and as expressed mathematically in equation 2:

$$\text{Min\_Threshold2} = \text{Maximum}(\text{Reference threshold}, \text{Min\_Threshold2} + \text{Reference threshold}) \quad (2)$$

wherein the Reference threshold is the reference threshold value defined based on the minimum power consumption mostly observed for the building. For example, most of the buildings may have the refrigerator ON always along with some other appliances such as television, lights, and so on. In an embodiment, the Reference threshold may be 200 Watts (W).

Further, the reference background power load consumption values are determined with respect to time using the first minimum threshold value (Min_Threshold1) and the second minimum threshold value (Min_Threshold2), and as mentioned in the below pseudo code:

Min_Threshold1=Miniumum($P_1, P_2, P_3, \ldots, P_n$)

Min_Threshold2=Maximum(200, Min_Threshold1+ 200)

$P_C$=Power consumption values with respect to time, in the pre-processed data samples obtained at step 204
For t in a range (0, length ($P_C$)−1
If $P_C(t+1)$>Min_Threshold2, then:
    If ((Min_Threshold1+$P_C(t+1)$−$P_C(t)$)<Min_Threshold2 and (Min_Threshold1+$P_C(t+1)$−$P_C(t)$)>0: then
        Reference background power load consumption value=Min_Threshold1+$P_C(t+1)$−$P_C(t)$
else
    Reference background power load consumption value=Min$_{Threshold}$1
else
    Reference background power load consumption value=$P_C(t+1)$ The power consumption values from each of the pre-processed data samples that are more than the corresponding reference background power load consumption value determined from the above mentioned pseudo code are indicated as the one or more background power load consumption values and such background power load consumption values are removed from each of the pre-processed data samples, to obtain the resultant data samples. Removing the background power load consumption values from each of the pre-processed data samples, helps in identifying the events (power changes due to the switching On/Off of the power loads) in a more accurate manner as the small variations due to the background power load consumption values and helps in not to interfere with the actual events that are contributing to the power consumption of the plurality of appliance types.

Figure 6:
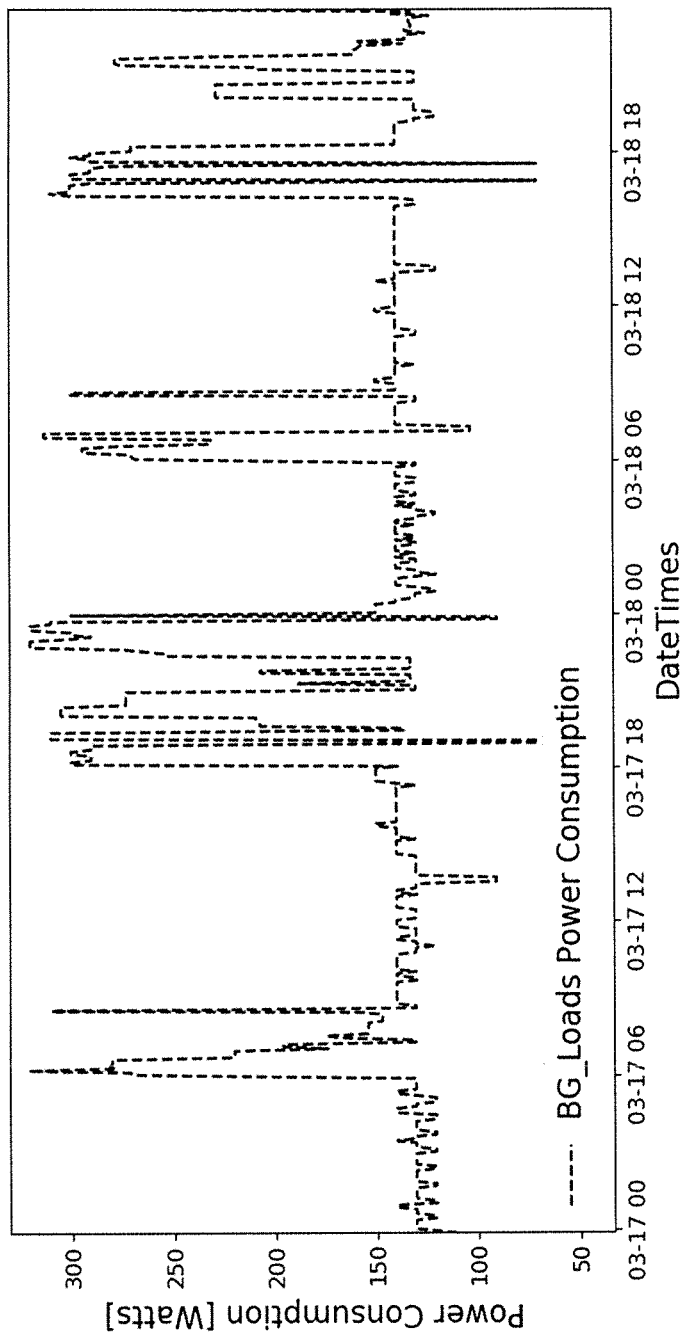
FIG. 6 is a graph showing exemplary background power load consumption data samples, in accordance with some embodiments of the present disclosure.
Figure 7:
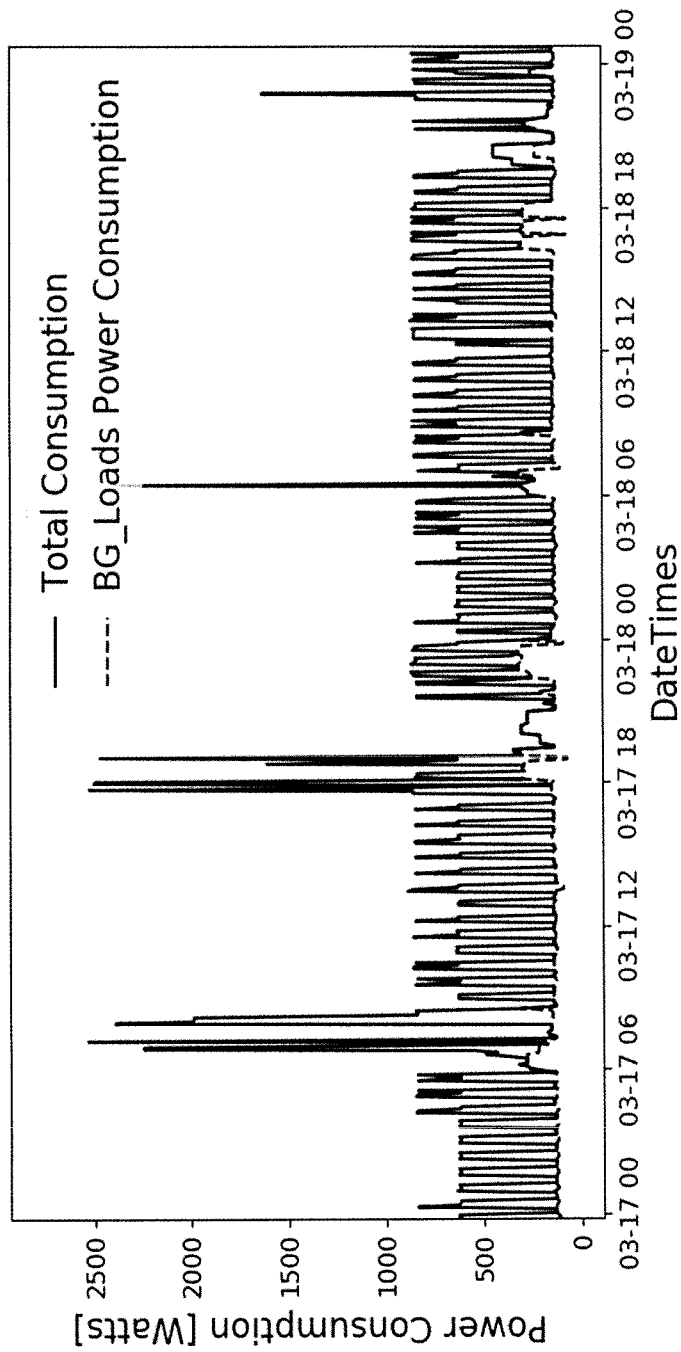
FIG. 7 is a graph showing exemplary processed power consumption data samples and exemplary background power load consumption data samples, together, in accordance with some embodiments of the present disclosure.

FIG. 6 is a graph showing exemplary background power load consumption data samples, in accordance with some embodiments of the present disclosure. FIG. 7 is a graph showing exemplary processed power consumption data samples and exemplary background power load consumption data samples, together, in accordance with some embodiments of the present disclosure. As shown in FIG. 6, the background power consumption envelope consisting of the low power loads, vampire loads are detected using the first threshold value and the second threshold value. The background power consumption envelope detected is subtracted from the pre-processed power consumption data samples. This helps in improving event detection and disaggregation of other major loads. From the figure, it could be noticed that BG power consumption envelope was detected in an efficient manner.

At step 208 of the method 200, the one or more hardware processors 104 of the system 100 are configured to detect a plurality of positive events and a plurality of negative events, occurred from amongst the plurality of resultant data samples obtained at step 206 of the method 200. The plurality of positive events and the plurality of negative events are detected based on a change in the power consumption and using the time stamp for each of the plurality of resultant data samples.

Firstly, a plurality of events is detected, from the plurality of resultant data samples. If the change in the power consumption value between two consecutive resultant data samples is more than or equal to an event threshold value, then such change is represented as an event. For example, if the power consumption at timestamp 10:10 is 150 W and if the successive power consumption at timestamp 10:15 is 250 W, then such instance is represented as the event. More specifically, these events indicate the change in the power consumption due to some additional power loads or removal of existing power loads. For example, if some power load is added (for example, the washing machine is ON), or some power load is removed (for example, the air conditioner is OFF). All such plurality of events is detected from the plurality of resultant data samples.

The event threshold value is an experimentally defined value helps to avoid picking up the small variations in the power consumptions as the plurality of events. The event threshold value may slightly be different for each building type based on the number of appliances installed. For example, the event threshold value is 15 W.

Next, the plurality of positive events out of the plurality of events are detected. The plurality of positive events are those events having the change in the power consumption value between two consecutive resultant data samples, more than or equal to zero. Basically, the plurality of positive events represents the events when some power loads are added (for example, the washing machine is ON).

Similarly, the plurality of negative events out of the plurality of events are detected. The plurality of negative events are those events having the change in the power consumption value between two consecutive resultant data samples, less than zero. Basically, the plurality of negative events represents the events when some power loads are removed (for example, the air conditioner is OFF). The sum of the plurality of positive events and the plurality of negative events is equal to the plurality of events detected from the plurality of resultant data samples.

Simple events are the changes in the power consumption (either the positive events or the negative events), and these events are sometimes deceptive as the power consumption changes pertaining to same load could happen in multiple windows (multiple data samples) due to very low sampling rate. These types of events are to be combined in a judicious manner to get the actual event and these events are referred as composite events. The composite events are obtained by combining the consecutive positive events or the negative events together.

Figure 8:
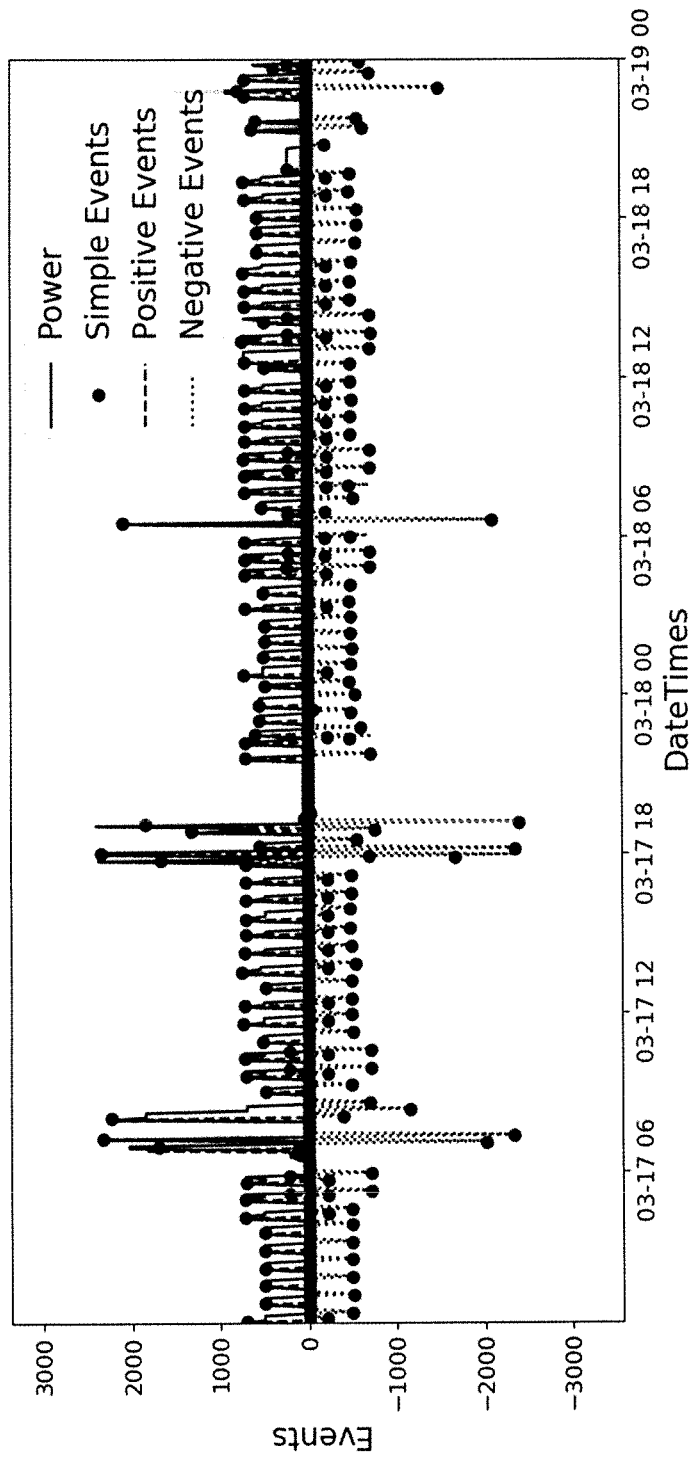
FIG. 8 is a graph showing exemplary simple events, exemplary positive events, and exemplary negative events, in accordance with some embodiments of the present disclosure.

Thus, one or more positive events of the plurality of positive events having occurred sequentially between consecutive resultant data samples, are combined to obtain a simple positive event and such positive events are referred as composite positive events. Similarly, one or more negative events of the plurality of negative events having occurred sequentially between consecutive resultant data samples, are combined to obtain a single negative event and such negative events are referred as composite negative events. The resultant positive events and the resultant negative events are referred as the plurality of positive events and the plurality of negative events respectively, for further processing. FIG. 8 is a graph showing exemplary simple events, exemplary positive events, and exemplary negative events, in accordance with some embodiments of the present disclosure. The simple events are the events occurred due to the small change the power consumptions and some of the simple events may be positive events or negative events. Such simple events are added together to make the single composite event.

Figure 3:
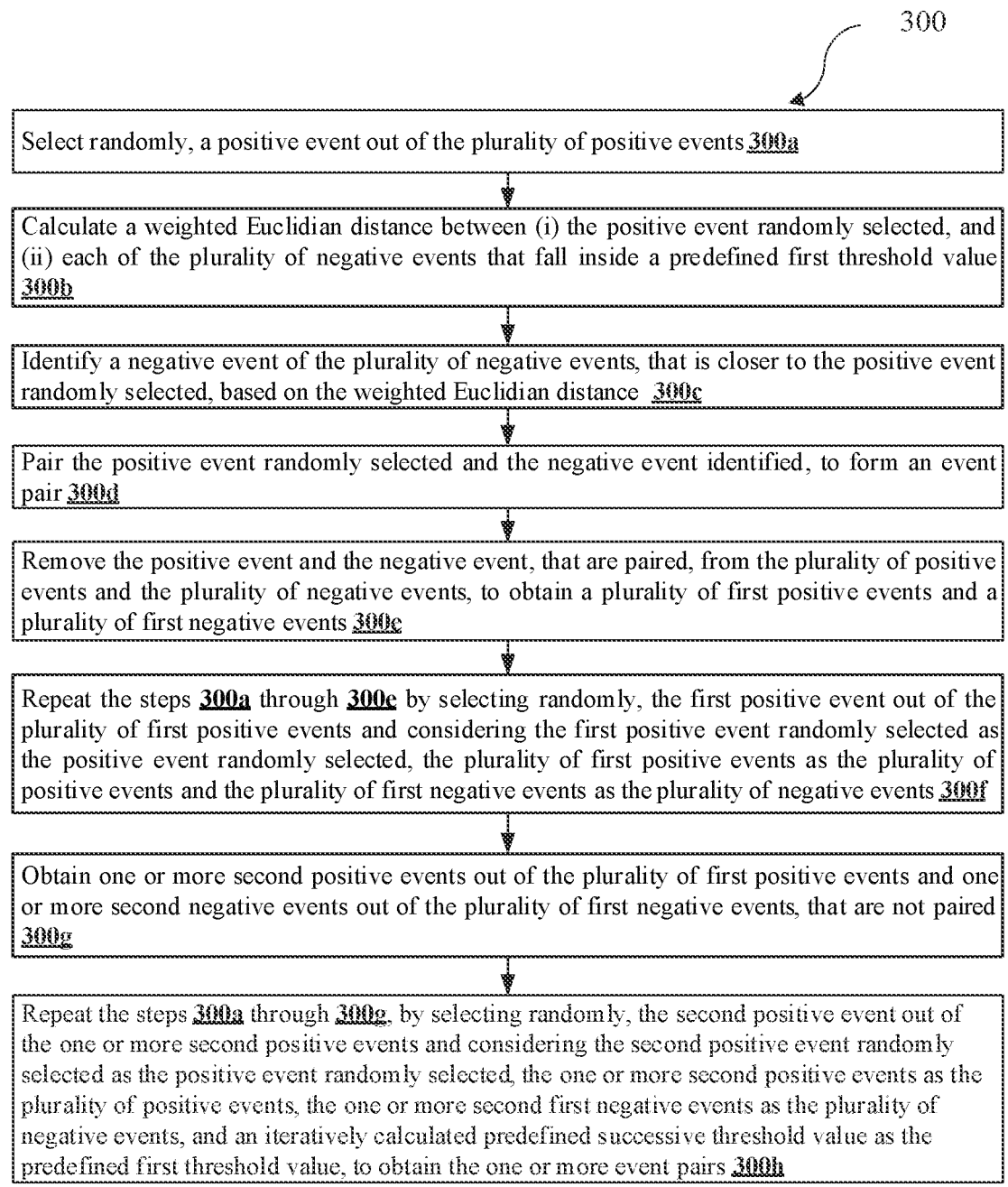
FIG. 3 is a flowchart showing a process of obtaining one or more event pairs, from a plurality of positive events and a plurality of negative events, using an iterative event pairing technique, in accordance with some embodiments of the present disclosure.

At step 210 of the method 200, the one or more hardware processors 104 of the system 100 are configured to obtain one or more event pairs, from the plurality of positive events and the plurality of negative events detected at step 208 of the method 200. An iterative event pairing technique is employed to obtain the one or more event pairs, from the plurality of positive events and the plurality of negative events. The iterative event pairing technique is used for iterative pairing of events to avoid pairing the unwanted events. FIG. 3 is a flowchart showing a process 300 of obtaining the one or more event pairs, from the plurality of positive events and the plurality of negative events, using the iterative event pairing technique, in accordance with some embodiments of the present disclosure. The process 300 is explained through steps 300a to 300h.

At step 300a, a positive event is randomly selected out of the plurality of positive events detected at step 208 of the method 200. Then, at step 300b, a weighted Euclidian distance between (i) the positive event randomly selected at step 300a, and (ii) each of the plurality of negative events (detected at step 208 of the method 200) that fall inside a predefined first threshold value. The weighted Euclidian distance is calculated using a weighted Euclidian distance function comprising predefined weights defined based on the magnitude of the power consumption and the operational time (distance between the positive event and the corresponding negative event. The magnitude of the power consumption has more weightage compared to the operational time. The weighted Euclidian distance function is defined in such a way to avoid equal distances between the events as there is a probability of resulting equal distances for multiple combinations of the magnitude of the power consumption and the operational time.

The predefined first threshold value is defined based the operational time and the deviation of the magnitude of the power consumption. In an embodiment, the operational time may be 15 minutes and the deviation of the magnitude of the power consumption may be 10%.

At step 300c, a negative event of the plurality of negative events, that is closer to the positive event randomly selected at step 300a, is identified based on the corresponding weighted Euclidian distance. More specifically the negative event having the smallest weighted Euclidian distance to the positive event randomly selected at step 300a, is identified.

At step 300d, the positive event randomly selected at step 300a and the negative event identified at step 300c, are paired together, to form an event pair and such event pairs are added to the event pairs bucket. At step 300e, the positive event and the negative event, that are paired at step 300d, are removed from the plurality of positive events and the plurality of negative events detected at step 208 of the method 200, to obtain a plurality of first positive events and a plurality of first negative events. The plurality of first positive events and plurality of first negative events are the resultant positive events and the resultant negative events after removing the positive event and the negative event, that are paired at step 300d, respectively.

At step 300f, the steps 300a through 300e are repeated by selecting randomly, the first positive event out of the plurality of first positive events and considering the first positive event randomly selected as the positive event randomly selected, the plurality of first positive events as the plurality of positive events and the plurality of first negative events as the plurality of negative events. The step of 300f is valid if number of the plurality of first positive events are more than two and the if number of the plurality of first negative events are more than two. The step 300f results in the further events pairs and are added to the event pairs bucket.

Next, at step 300g, one or more second positive events out of the plurality of first positive events and one or more second negative events out of the plurality of first negative events, that are not paired in the above steps are obtained for further event pairing. At step 300h, the steps 300a through 300g are repeated by selecting randomly, the second positive event out of the one or more second positive events and considering the second positive event randomly selected as the positive event randomly selected, the one or more second positive events as the plurality of positive events, the one or more second first negative events as the plurality of negative events. In this step 300h, an iteratively calculated predefined successive threshold value is considered as the predefined first threshold value, to obtain the one or more event pairs. The predefined successive threshold value is iteratively calculated by increasing the operational time and the deviation of the magnitude of the power consumption, in each iteration. This process is repeated until all the positive events and all the negative events are paired using the iteratively calculated predefined successive threshold value.

Figure 4:
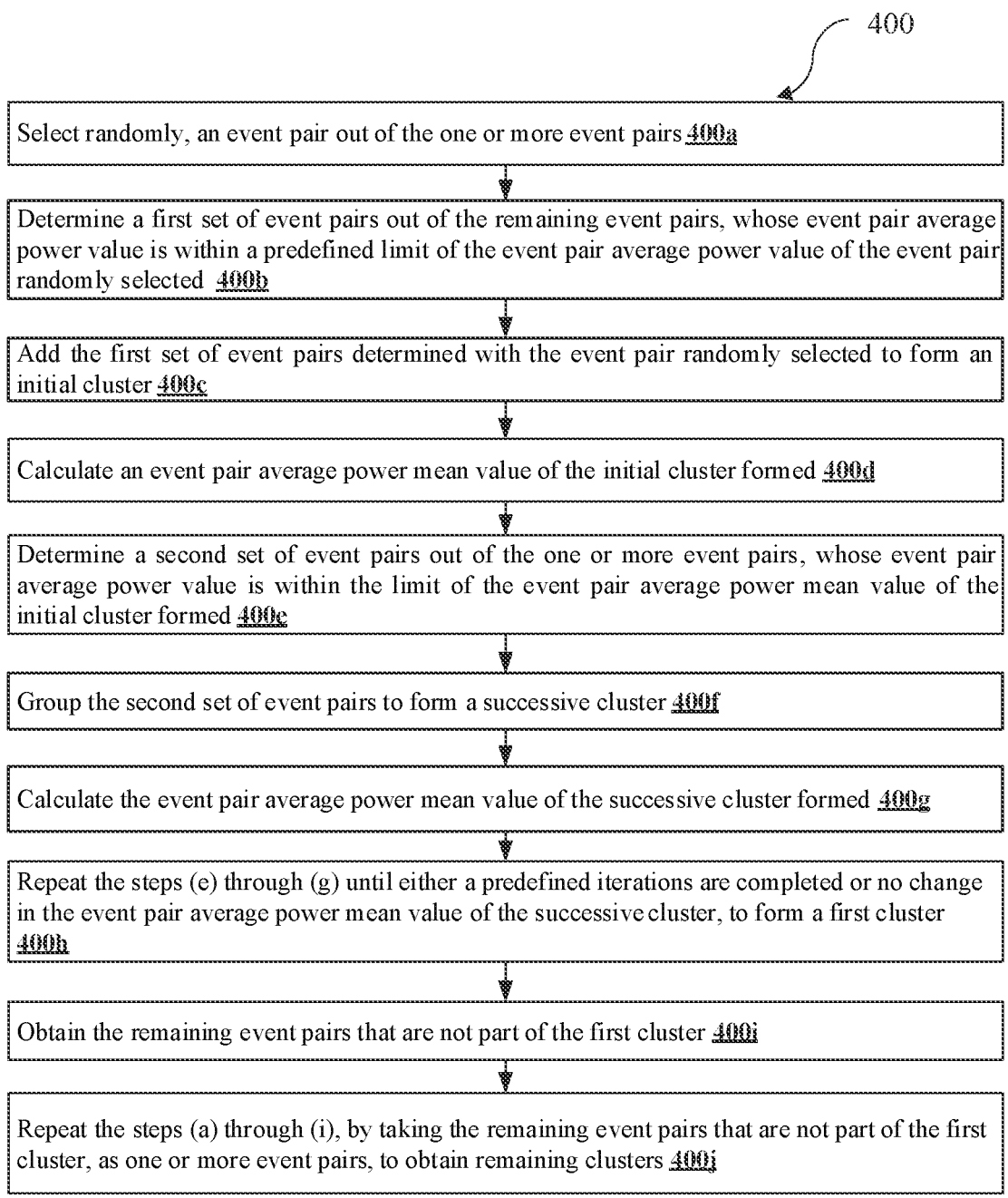
FIG. 4 is a flowchart showing a process of forming one or more event pair clusters from the one or more event pairs, using a density-based clustering technique, in accordance with some embodiments of the present disclosure.

At step 212 of the method 200, the one or more hardware processors 104 of the system 100 are configured to form one or more event pair clusters from the one or more event pairs obtained at step 210 of the method 200. A density-based clustering technique is employed for forming the one or more event pair clusters from the one or more event pairs. FIG. 4 is a flowchart showing a process 400 of forming the one or more event pair clusters from the one or more event pairs, using the density-based clustering technique, in accordance with some embodiments of the present disclosure. The process 400 is explained through steps 400a to 400j.

At step 400a, an event pair out of the one or more event pairs obtained step 210 of the method 200, is randomly selected. At step 400b, a first set of event pairs out of the remaining event pairs (except the event pair randomly selected at step 400a), is determined. The first set of event pairs are those event pairs whose event pair average power value is within a predefined limit of the event pair average power value of the event pair randomly selected at step 400a. The event pair average power value of each event pair is obtained by taking the average of (i) the positive power consumption change associated with the positive event that is present in the corresponding event pair and (ii) the negative power consumption change associated with the negative event that is present in the corresponding event pair.

While clustering, the predefine limit of the event pair average power value is defined based on 10% deviation in magnitude of the power consumption was put as the constraint while forming the event pairs as one group as the same appliance in a particular building may not have more than 10% variation irrespective of the operational time.

At step 400c, the first set of event pairs determined at step 400b are added with the event pair randomly selected at step 400a, to form an initial cluster. At step 400d, an event pair average power mean value of the initial cluster formed at step 400c, is calculated. The event pair average power mean value of the initial cluster is a mean of the event pair average power value of each event pair present in the initial cluster.

At step 400e, a second set of event pairs out of the one or more event pairs obtained step 210 of the method 200. The second set of event pairs includes one or more event pairs whose event pair average power value is within the limit of the event pair average power mean value of the initial cluster formed, calculated at step 400d. At step 400f, the second set of event pairs grouped to form a successive cluster Next, at step 400g, the event pair average power mean value of the successive cluster formed at step 400f is calculated. At step 400h, the steps 400e through 400g are repeated until either a predefined iterations are completed or no change in the event pair average power mean value of the successive cluster, to form a first cluster and the first cluster is added to the event pair cluster bucket.

Figure 9:
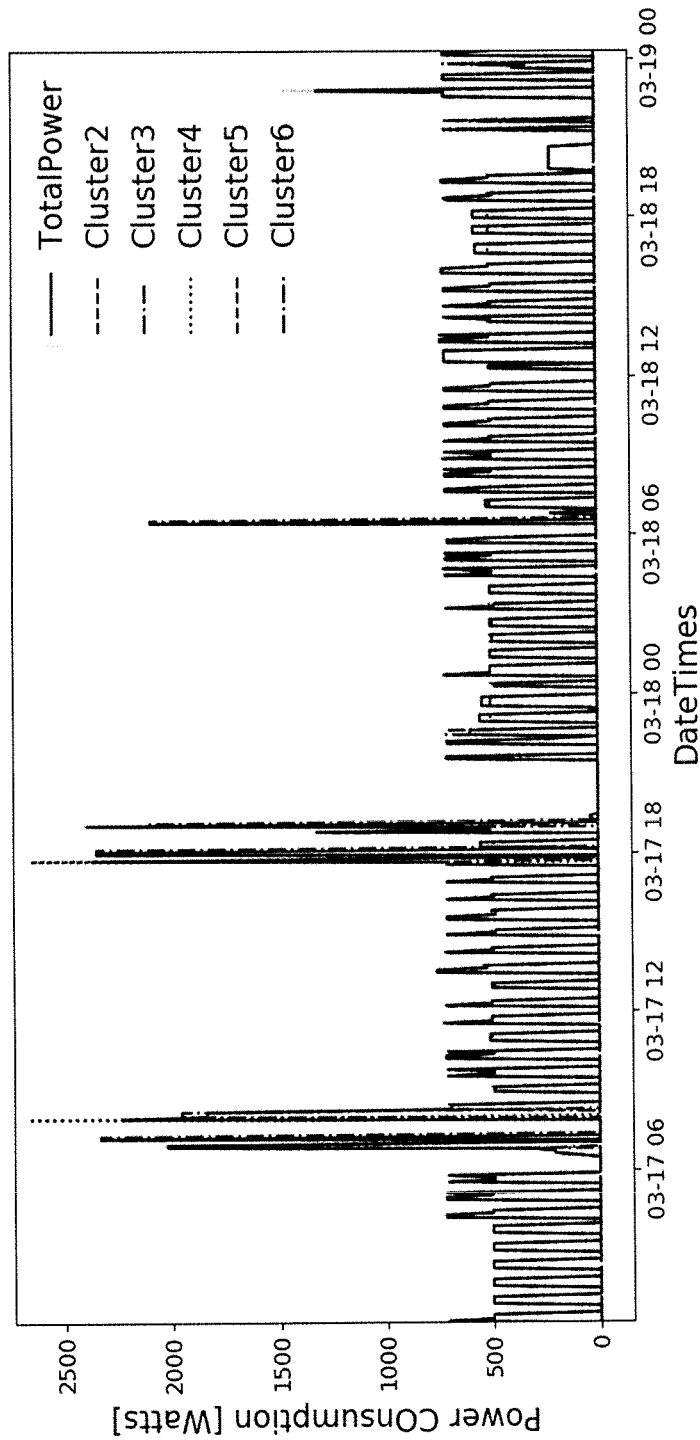
FIG. 9 is a graph showing exemplary clusters formed using a density-based clustering technique, in accordance with some embodiments of the present disclosure.

Further, at step 400i, the remaining event pairs that are not part of the first cluster formed at step 400h, from the one or more event pairs obtained step 210 of the method 200, are obtained. Lastly, at step 400j, the steps 400a through 400i are repeated by taking the remaining event pairs that are not part of the first cluster, as one or more event pairs, to obtain next first cluster and like these remaining clusters are determined until no event pair is left un-clustered to form the one or more event pair clusters. Each event pair cluster includes one or more event pairs out of the plurality of event pairs, and the one or more event pairs present in each event pair cluster indicates the similar power consumption patterns. FIG. 9 is a graph showing exemplary clusters formed using the density-based clustering technique, in accordance with some embodiments of the present disclosure. As shown in FIG. 9, the density-based clustering technique is used to cluster the event pairs with a bound of +−10% deviation on the average event pair magnitude of the power consumption.

At step 214 of the method 200, the one or more hardware processors 104 of the system 100 are configured to classify an appliance type of the plurality of appliance types, for each event pair cluster of the one or more event pair clusters formed at step 212 of the method 200. The rule-based classification technique is employed to classify the appliance type of the plurality of appliance types, for each event pair cluster. Further, the power consumption for each of the classified appliance type is estimated, using the rule-based classification technique to obtain the power load disaggregation profile of the building.

The rule-based classification technique includes a set of rules. Each of the set of rules is defined to each appliance type and based on (i) appliance consumption levels of each appliance type, (ii) an usual operational time of each appliance type, (iii) an usage behaviour of each appliance type, and (iv) seasonal appliance information of each appliance type. The seasonal appliance information of each appliance type is obtained using correlation analysis of annual power consumption of the building and local weather information.

The annual power consumption data in correlation with the local weather information (especially temperature) is used to understand weather dependent loads such as power load from the space heaters, the air conditioners (AC), etc. correlation analysis helps us to classify the similar loads such as space heater, water boilers, and so on, during the power load disaggregation process. The positive correlation between the annual power consumption and the local weather information, shows that if the temperature increases, then the power consumption also increases. This shows there may be the air-conditioner load inside the building. The negative correlation between the annual power consumption and the local weather information, shows there may be the space heater load inside the building. If there is no correlation, then the building may not have any seasonal dependent load.

The set of rules are defined based on the below mentioned parameters and some of the exemplary rules are mentioned:
Power consumption—Very low <200 w
   Low—200 to 400 W
   Average—400 to 1500 W
   High—1500 to 1800 W
   Vhigh—1800 to 2500 W
   Vvhigh->2500 and <6000 W
   Extremely high >6000 W
Operational times—Only Day, All Day, Only Nights
Operational frequency—Low (1 or 2)
   Medium (>2 and <=4)
   High (>=5)
Building type—Individual building (Villa)
   Apartment
   Commercial building
   Any building (Individual building/Flat/Commercial building)
Operational duration—Vlow <5 min
   Low—(5 to 15 min)
   Average (15 min to 60 min)
   High (>1 hour)
Seasonal loads—Present
   Absent The set of rules:
if Cluster_Power consumption is "Extremely High" and building type is "any building" and Operational times is "All Day" and Seasonal loads is "Present" then, appliance type is "Space heater"
if Cluster_Power consumption is "Extremely High" and building type is "any building" and Operational times is "All Day" and Seasonal loads is "Absent" then, appliance type is "Water boiler"
if Cluster_Power consumption is "Extremely High" and building type is "Individual building" and Operational times is "Only Day" and Operational frequency is "Low" then, appliance type is "Electric vehicle (EV) Charging"
if Cluster_Power consumption is "High" and building type is "Individual building" and Operational times="Only Day" and Operational frequency is "Low" then, appliance type is "EV Charging"
if Cluster_Power consumption is "Low" and Operational frequency is "High" and Operational times is "All Day" then, appliance type is "Refrigerator"
if Cluster_Power consumption is "Low" and Operational frequency is "Low" and Operational times is "Only Day" then, appliance type is "Television (TV)"
if Cluster_Power consumption is "Very Low" and Operational frequency is "High" and Operational times is "All Day" then, appliance type is "Small Refrigerator (Fridge)"
if Cluster_Power consumption is "Very Low" and Operational frequency is "Low" and Operational times is "only Day" then, appliance type is "Laptop/Lighting/Fan"
if Cluster_Power consumption is "Low" and Operational frequency is "Low" and Operational times is "only Nights" then, appliance type is "Unknown Load"
if Cluster_Power consumption is "Average" and Operational frequency is "Low" and Operational times is "only Day" then, appliance type is "Microwave"
if Cluster_Power consumption is "Average" and Operational frequency is "High" and Operational times is "only Day" and Operational Duration is "Average" then, appliance type is "Other Cooking Appliances"
if Cluster_Power consumption is "Average" and Operational frequency is "High" and Operational times is "only Day" and Operational Duration is "Low" then, appliance type is "Iron Box/Vacuum Cleaner"
if Cluster_Power consumption is "Average" and Operational frequency is "High" and Operational times is "All Day" and Operational Duration is "Average/High" then, appliance type is "Space Heater"
if Cluster_Power consumption is "High" and Operational frequency is "Low" and Operational times is "Only Day" and Operational Duration is "Average" then, appliance type is "Washing Machine"
if Cluster_Power consumption is "High" and Operational frequency is "Low" and Operational times is "Only Day" and Operational Duration is "High" then, appliance type is "Dish Washer"
if Cluster Power consumption is "VHigh" and Operational frequency is "Low" and Operational times is "Only Day" and Operational Duration is "Average or High" then, appliance type is "Microwave Oven"

Figure 10:
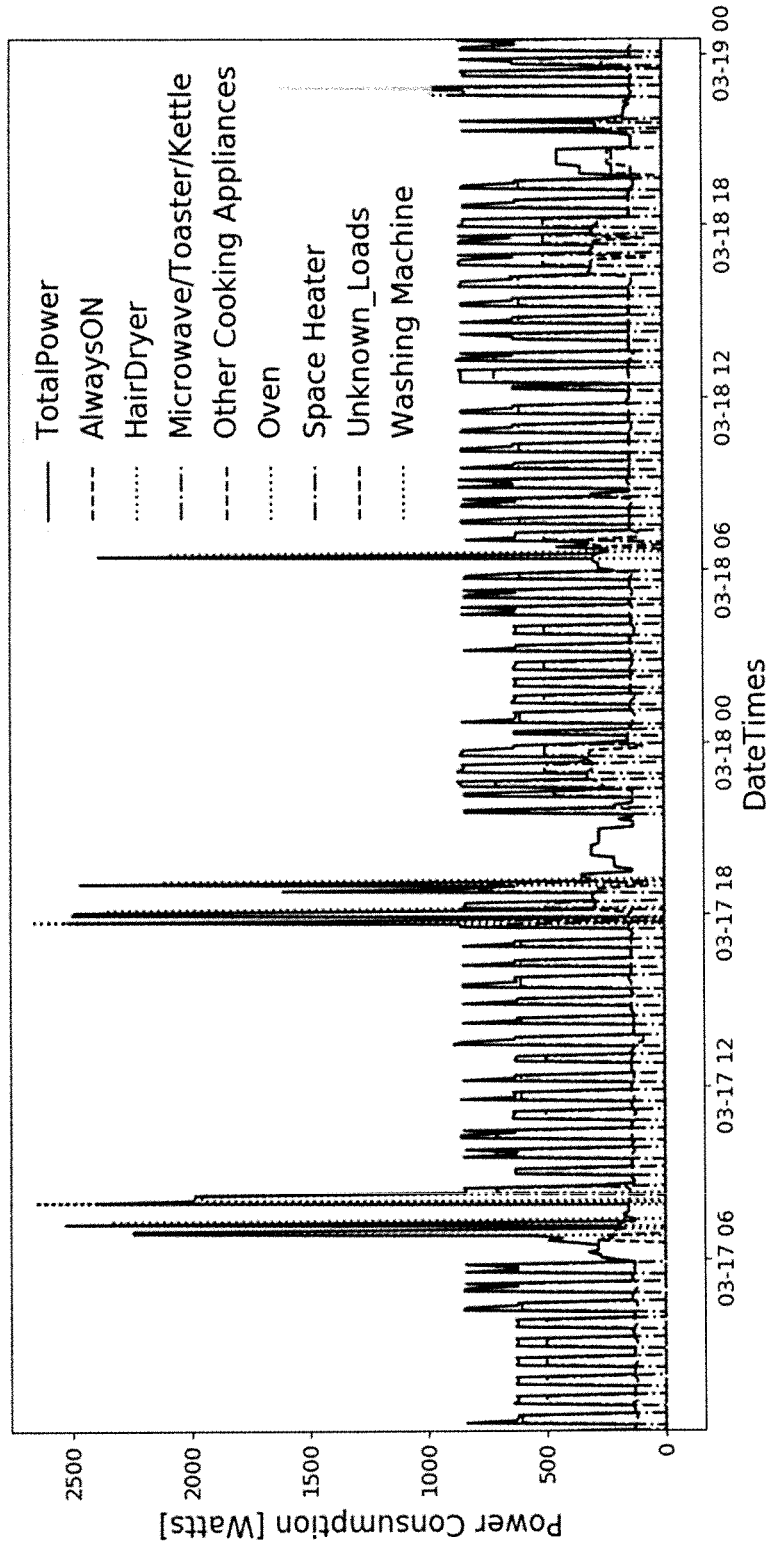
FIG. 10 is a graph showing an exemplary classified appliance type for each cluster, in accordance with some embodiments of the present disclosure.
Figure 11:
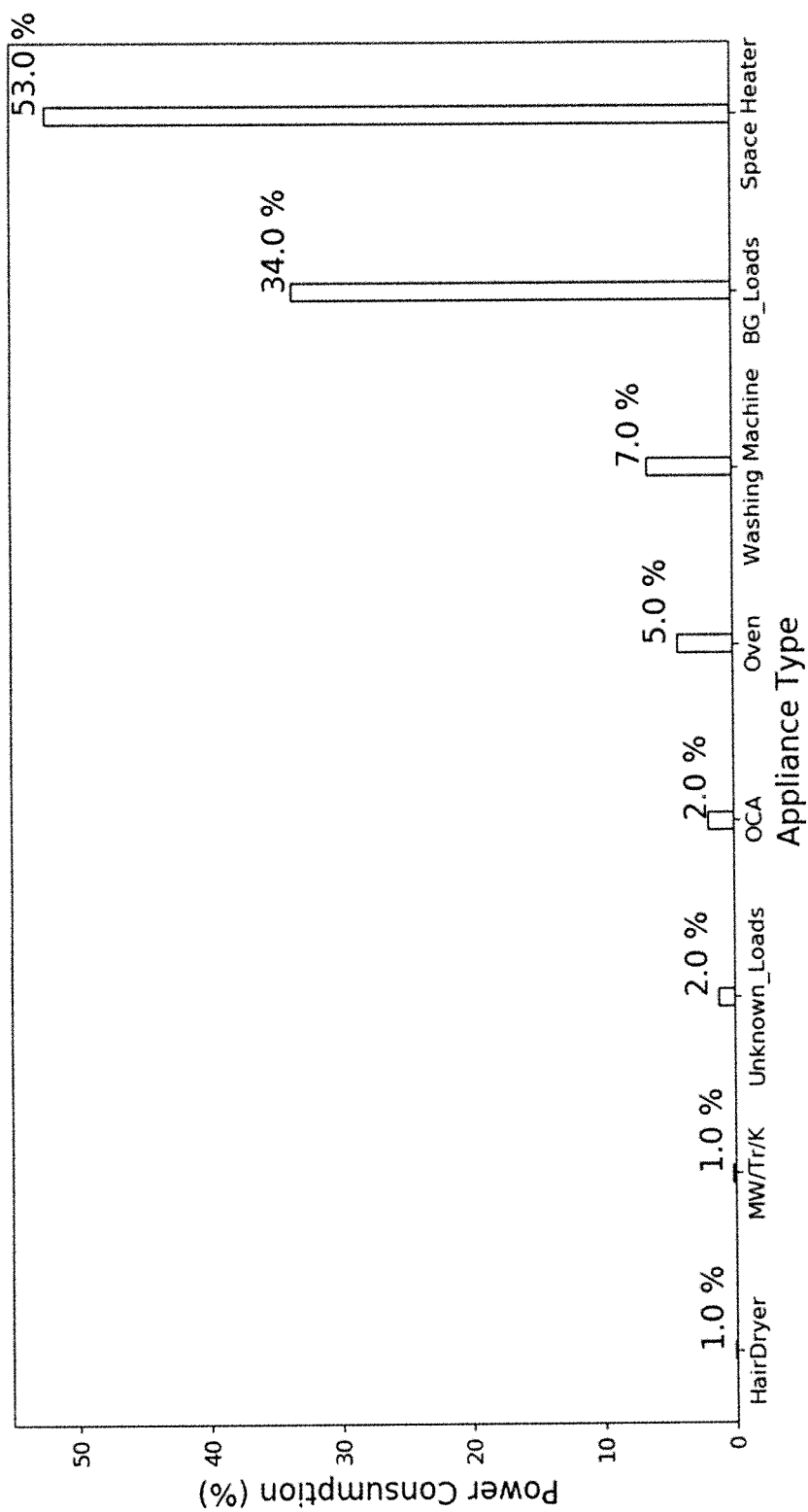
FIG. 11 is a graph showing an exemplary power consumption pattern of each appliance type, in accordance with some embodiments of the present disclosure.

FIG. 10 is a graph showing an exemplary classified appliance type for each cluster, in accordance with some embodiments of the present disclosure. As shown in FIG. 10, each appliance type is classified for each cluster, based on the set of the rules. The appliance types present in FIG. 10 are space heater, washing machine, microwave oven, hair dryer, TV, other cooking appliances, other appliances, and BG loads. FIG. 11 is a graph showing an exemplary power consumption pattern of each appliance type, in accordance with some embodiments of the present disclosure. As shown in FIG. 11, the appliance 'space heater' has consumed more power (53%) of the total power consumption, whereas the appliances 'hair dryer', 'toaster', 'microwave oven', and 'kettle' have consumed very less power of the total power consumption.

The method and systems of the present disclosure provides accurate power load disaggregation profile of the building using only with the low-sampling rate power consumption data. Removing the background power load consumption values from each of the pre-processed data samples, helps in identifying the events (power changes due to the switching On/Off of the power loads) in a more accurate manner as the small variations due to the background power load consumption values and helps in not to interfere with the actual events that are contributing to the power consumption of the plurality of appliance types. As the events detected are more accurate, the event pairs determined are clusters effectively that have the same power consumption patterns. The set of classification rules are further defined based on the appliance consumption levels of each appliance type, the usual operational time of each appliance type, the usage behaviour of each appliance type, and the seasonal appliance information of each appliance type. Hence the set of the classification rules are effectively applied to each cluster to classify each appliance type associated with each cluster. The method of the present disclosure is simple and yet effective and can be applied for any application scenarios.

The embodiments of present disclosure herein address unresolved problem of the determining power consumption load disaggregation profile of the building using only with the low-sampling rate power consumption data. The power load disaggregation provided energy know-how to the consumers enabling them to optimize respective power or energy consumption and which certainly helpful for cost reduction. The power load disaggregation is used to let the consumers know how efficient in the energy consumption compare to their neighbors and apply optimized planning for peak load shaving, energy saving recommendations, appliances recommendations, control on scheduled loads, and so on.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g., any kind of computer like a server or a personal computer, or the like, or any combination thereof. The device may also include means which could be e.g., hardware means like e.g., an application-specific integrated circuit (ASIC), a field-programmable gate array (FPGA), or a combination of hardware and software means, e.g., an ASIC and an FPGA, or at least one microprocessor and at least one memory with software processing components located therein. Thus, the means can include both hardware means and software means. The method embodiments described herein could be implemented in hardware and software. The device may also include software means. Alternatively, the embodiments may be implemented on different hardware devices, e.g., using a plurality of CPUs.

The embodiments herein can comprise hardware and software elements. The embodiments that are implemented in software include but are not limited to, firmware, resident software, microcode, etc. The functions performed by various components described herein may be implemented in other components or combinations of other components. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope of disclosed embodiments being indicated by the following claims.

What is claimed is:

1. A processor-implemented method for determining a power load disaggregation profile of a building, the method comprising the steps of:
   receiving sequentially, via one or more hardware processors, a plurality of data samples associated with a power consumption of the building having a plurality of appliance types measured using a smart meter installed in the building, and a time stamp for each of the plurality of data samples, wherein the building is connected to a power source or a power grid, through the smart meter, wherein each data sample of the plurality of data samples, is a power signal, obtained at a predefined low-sampling rate in minutes during the power consumption of the building;
   pre-processing, via the one or more hardware processors, the plurality of data samples to obtain a plurality of pre-processed data samples and the time stamp for each of the plurality of pre-processed data samples, wherein the pre-processing includes filling missing data and outlier removal;
   detecting and removing, via the one or more hardware processors, one or more background power load consumptions, from each of the plurality of pre-processed data samples, to obtain a plurality of resultant data samples;
   detecting, via the one or more hardware processors, a plurality of positive events and a plurality of negative events, from amongst the plurality of resultant data samples, using the time stamp for each of the plurality of resultant data samples, based on a change in the power consumption;
   obtaining, via the one or more hardware processors, one or more event pairs, from the plurality of positive events and the plurality of negative events, using an iterative event pairing technique;
   forming, via the one or more hardware processors, one or more event pair clusters from the one or more event pairs, using a density-based clustering technique; and
   classifying, via the one or more hardware processors, an appliance type of the plurality of appliance types, for each of the one or more event pair clusters, and estimating the power consumption for each of the classified appliance type, using a rule-based classification technique, to obtain the power load disaggregation profile of the building, wherein the rule-based classification technique comprises a set of rules and each of the set of rules is defined based on (i) appliance consumption levels of each appliance type in watts ranging from very low of less than predefined watts, low of more than the predefined watts, average, high, and extremely high, (ii) an usual operational time of each appliance type as only day, all day, only nights, (iii) an usage behaviour of each appliance type as low with 1 or 2 value, medium as greater than 2 and less than or equal to 4, and high with greater than and equal to 5, and (iv) seasonal appliance information of each appliance type, obtained using correlation analysis of annual power consumption of the building and local weather information, wherein loads are controlled based on the power load disaggregation profile using a predefined low-sampling rate for optimizing power usage.

2. The method of claim 1, wherein the plurality of data samples associated with the power consumption of the building, is of a predefined time-window.

3. The method of claim 1, wherein the one or more background power load consumptions from each of the plurality of pre-processed data samples, are detected based on a first minimum threshold value and a second minimum threshold value, wherein the first minimum threshold value and the second minimum threshold value are determined using night power load consumptions.

4. The method of claim 1, wherein detecting the plurality of positive events and the plurality of negative events, from the plurality of resultant data samples, using the time stamp for each of the plurality of resultant data samples, based on the change in the power consumption, comprises:
  detecting a plurality of events, from the plurality of resultant data samples, based on the change in the power consumption between two consecutive resultant data samples is greater than or equal to an event threshold value;
  detecting the plurality of positive events out of the plurality of events having the change in the power consumption between two consecutive resultant data samples, greater than or equal to zero; and
  detecting the plurality of negative events out of the plurality of events, having the change in the power consumption between two consecutive resultant data samples, less than zero.

5. The method of claim 4, further comprising:
  combining one or more positive events of the plurality of positive events having occurred sequentially between consecutive resultant data samples, to obtain composite positive events; and
  combining one or more negative events of the plurality of negative events having occurred sequentially between consecutive resultant data samples, to obtain composite negative events.

6. The method of claim 1, wherein obtaining the one or more event pairs, from the plurality of positive events and the plurality of negative events, using the iterative event pairing technique, comprises:
  (a) selecting randomly, a positive event out of the plurality of positive events;
  (b) calculating a weighted Euclidian distance between (i) the positive event randomly selected, and (ii) each of the plurality of negative events that fall inside a predefined first threshold value;
  (c) identifying a negative event of the plurality of negative events, that is closer to the positive event randomly selected, based on the weighted Euclidian distance;
  (d) pairing the positive event randomly selected and the negative event identified, to form an event pair;
  (e) removing the positive event and the negative event, that are paired, from the plurality of positive events and the plurality of negative events, to obtain a plurality of first positive events and a plurality of first negative events;
  (f) repeating the steps (a) through (e) by selecting randomly, the first positive event out of the plurality of first positive events and considering the first positive event randomly selected as the positive event randomly selected, the plurality of first positive events as the plurality of positive events and the plurality of first negative events as the plurality of negative events;
  (g) obtaining one or more second positive events out of the plurality of first positive events and one or more second negative events out of the plurality of first negative events, that are not paired; and
  (h) repeating the steps (a) through (g), by selecting randomly, the second positive event out of the one or more second positive events and considering the second positive event randomly selected as the positive event randomly selected, the one or more second positive events as the plurality of positive events, the one or more second first negative events as the plurality of negative events, and an iteratively calculated predefined successive threshold value as the predefined first threshold value, to obtain the one or more event pairs.

7. The method of claim 1, wherein forming the one or more event pair clusters from the one or more event pairs, using the density-based clustering technique, comprises:
  (a) selecting randomly, an event pair out of the one or more event pairs;
  (b) determining a first set of event pairs out of the remaining event pairs, whose event pair average power value is within a predefined limit of the event pair average power value of the event pair randomly selected;
  (c) adding the first set of event pairs determined with the event pair randomly selected to form an initial cluster;
  (d) calculating an event pair average power mean value of the initial cluster formed;
  (e) determining a second set of event pairs out of the one or more event pairs, whose event pair average power value is within the limit of the event pair average power mean value of the initial cluster formed;
  (f) grouping the second set of event pairs to form a successive cluster;
  (g) calculating the event pair average power mean value of the successive cluster formed;
  (h) repeating the steps (e) through (g) until either a predefined iterations are completed or no change in the event pair average power mean value of the successive cluster, to form a first cluster;
  (i) obtaining the remaining event pairs that are not part of the first cluster; and
  (j) repeating the steps (a) through (i), by taking the remaining event pairs that are not part of the first cluster, as one or more event pairs, to obtain remaining clusters.

8. A system for determining a power load disaggregation profile of a building, the system comprising:
  a memory storing instructions;
  one or more Input/Output (I/O) interfaces; and
  one or more hardware processors coupled to the memory via the one or more I/O interfaces, wherein the one or more hardware processors are configured by the instructions to:
  receive sequentially, a plurality of data samples associated with a power consumption of the building having a plurality of appliance types measured using a smart meter installed in the building, and a time stamp for each of the plurality of data samples, wherein the building is connected to a power source or a power grid, through the smart meter, wherein each data sample of the plurality of data samples, is a power signal, obtained at a predefined low-sampling rate in minutes during the power consumption of the building;
  pre-process the plurality of data samples to obtain a plurality of pre-processed data samples, wherein the pre-processing includes filling missing data and outlier removal;
  detect and remove one or more background power load consumptions, from each of the plurality of pre-processed data samples, to obtain a plurality of resultant data samples;
  detect a plurality of positive events and a plurality of negative events, from amongst the plurality of resultant data samples, using the time stamp for each of the plurality of resultant data samples, based on a change in the power consumption;
obtain one or more event pairs, from the plurality of positive events and the plurality of negative events, using an iterative event pairing technique;
form one or more event pair clusters from the one or more event pairs, using a density-based clustering technique; and
classify an appliance type of the plurality of appliance types, for each of the one or more event pair clusters, and estimating the power consumption for each of the classified appliance type, using a rule-based classification technique, to obtain the power load disaggregation profile of the building, wherein the rule-based classification technique comprises a set of rules and each of the set of rules is defined based on (i) appliance consumption levels of each appliance type in watts ranging from very low of less than predefined watts, low of more than the predefined watts, average, high, and extremely high, (ii) an usual operational time of each appliance type as only day, all day, only nights, (iii) an usage behaviour of each appliance type as low with 1 or 2 value, medium as greater than 2 and less than or equal to 4, and high with greater than and equal to 5, and (iv) seasonal appliance information of each appliance type, obtained using correlation analysis of annual power consumption of the building and local weather information, wherein loads are controlled based on the power load disaggregation profile using a predefined low-sampling rate for optimizing power usage.

9. The system of claim 8, wherein the plurality of data samples associated with the power consumption of the building, is of a predefined time-window.

10. The system of claim 8, wherein the one or more hardware processors are configured to detect and remove the one or more background power load consumptions from each of the plurality of pre-processed data samples, based on a first minimum threshold value and a second minimum threshold value, wherein the first minimum threshold value and the second minimum threshold value are determined using night power load consumptions.

11. The system of claim 8, wherein the one or more hardware processors are configured to detect the plurality of positive events and the plurality of negative events, from the plurality of resultant data samples, using the time stamp for each of the plurality of resultant data samples, based on the change in the power consumption, by:
detecting a plurality of events, from the plurality of resultant data samples, based on the change in the power consumption between two consecutive resultant data samples is greater than or equal to an event threshold value;
detecting the plurality of positive events out of the plurality of events having the change in the power consumption between two consecutive resultant data samples, greater than or equal to zero; and
detecting the plurality of negative events out of the plurality of events, having the change in the power consumption between two consecutive resultant data samples, less than zero.

12. The system of claim 11, wherein the one or more hardware processors are further configured to:

combine one or more positive events of the plurality of positive events having occurred sequentially between consecutive resultant data samples, to obtain composite positive events; and
combine one or more negative events of the plurality of negative events having occurred sequentially between consecutive resultant data samples, to obtain composite negative events.

13. The system of claim 8, wherein the one or more hardware processors are configured to obtain the one or more event pairs, from the plurality of positive events and the plurality of negative events, using the iterative event pairing technique, by:
(a) selecting randomly, a positive event out of the plurality of positive events;
(b) calculating a weighted Euclidian distance between (i) the positive event randomly selected, and (ii) each of the plurality of negative events that fall inside a predefined first threshold value;
(c) identifying a negative event of the plurality of negative events, that is closer to the positive event randomly selected, based on the weighted Euclidian distance;
(d) pairing the positive event randomly selected and the negative event identified, to form an event pair;
(e) removing the positive event and the negative event, that are paired, from the plurality of positive events and the plurality of negative events, to obtain a plurality of first positive events and a plurality of first negative events;
(f) repeating the steps (a) through (e) by selecting randomly, the first positive event out of the plurality of first positive events and considering the first positive event randomly selected as the positive event randomly selected, the plurality of first positive events as the plurality of positive events and the plurality of first negative events as the plurality of negative events;
(g) obtaining one or more second positive events out of the plurality of first positive events and one or more second negative events out of the plurality of first negative events, that are not paired; and
(h) repeating the steps (a) through (g), by selecting randomly, the second positive event out of the one or more second positive events and considering the second positive event randomly selected as the positive event randomly selected, the one or more second positive events as the plurality of positive events, the one or more second first negative events as the plurality of negative events, and an iteratively calculated predefined successive threshold value as the predefined first threshold value, to obtain the one or more event pairs.

14. The system of claim 8, wherein the one or more hardware processors are configured to form the one or more event pair clusters from the one or more event pairs, using the density-based clustering technique, by:
(a) selecting randomly, an event pair out of the one or more event pairs;
(b) determining a first set of event pairs out of the remaining event pairs, whose event pair average power value is within a predefined limit of the event pair average power value of the event pair randomly selected;
(c) adding the first set of event pairs determined with the event pair randomly selected to form an initial cluster;
(d) calculating an event pair average power mean value of the initial cluster formed;

(e) determining a second set of event pairs out of the one or more event pairs, whose event pair average power value is within the limit of the event pair average power mean value of the initial cluster formed;

(f) grouping the second set of event pairs to form a successive cluster;

(g) calculating the event pair average power mean value of the successive cluster formed;

(h) repeating the steps (e) through (g) until either a predefined iterations are completed or no change in the event pair average power mean value of the successive cluster, to form a first cluster;

(i) obtaining the remaining event pairs that are not part of the first cluster; and (j) repeating the steps (a) through (i), by taking the remaining event pairs that are not part of the first cluster, as one or more event pairs, to obtain remaining clusters.

15. One or more non-transitory machine-readable information storage mediums comprising one or more instructions which when executed by one or more hardware processors cause:

receiving sequentially, a plurality of data samples associated with a power consumption of the building having a plurality of appliance types measured using a smart meter installed in the building, and a time stamp for each of the plurality of data samples, wherein the building is connected to a power source or a power grid, through the smart meter, wherein each data sample of the plurality of data samples, is a power signal, obtained at a predefined low-sampling rate in minutes during the power consumption of the building;

pre-processing, the plurality of data samples to obtain a plurality of pre-processed data samples and the time stamp for each of the plurality of pre-processed data samples, wherein the pre-processing includes filling missing data and outlier removal;

detecting and removing, one or more background power load consumptions, from each of the plurality of pre-processed data samples, to obtain a plurality of resultant data samples;

detecting, a plurality of positive events and a plurality of negative events, from amongst the plurality of resultant data samples, using the time stamp for each of the plurality of resultant data samples, based on a change in the power consumption;

obtaining, one or more event pairs, from the plurality of positive events and the plurality of negative events, using an iterative event pairing technique;

forming, one or more event pair clusters from the one or more event pairs, using a density-based clustering technique; and classifying, an appliance type of the plurality of appliance types, for each of the one or more event pair clusters, and estimating the power consumption for each of the classified appliance type, using a rule-based classification technique, to obtain the power load disaggregation profile of the building, wherein the rule-based classification technique comprises a set of rules and each of the set of rules is defined based on (i) appliance consumption levels of each appliance type in watts ranging from very low of less than predefined watts, low of more than the predefined watts, average, high, and extremely high, (ii) an usual operational time of each appliance type as only day, all day, only nights, (iii) an usage behaviour of each appliance type as low with 1 or 2 value, medium as greater than 2 and less than or equal to 4, and high with greater than and equal to 5, and (iv) seasonal appliance information of each appliance type, obtained using correlation analysis of annual power consumption of the building and local weather information, wherein loads are controlled based on the power load disaggregation profile using a predefined low-sampling rate for optimizing power usage.

\* \* \* \* \*